US011834129B2

(12) United States Patent
Meadows

(10) Patent No.: US 11,834,129 B2
(45) Date of Patent: Dec. 5, 2023

(54) SMART SELF-LOCKING MAGNETIC BIKE PEDAL

(71) Applicant: Ravindran Meadows, Superior Township, MI (US)

(72) Inventor: Ravindran Meadows, Superior Township, MI (US)

( * ) Notice: Subject to any disclaimer, the term of this patent is extended or adjusted under 35 U.S.C. 154(b) by 0 days.

(21) Appl. No.: 17/829,817

(22) Filed: Jun. 1, 2022

(65) Prior Publication Data

US 2022/0411014 A1 Dec. 29, 2022

Related U.S. Application Data

(60) Provisional application No. 63/214,907, filed on Jun. 25, 2021.

(51) Int. Cl.
*B62M 3/08* (2006.01)
*A43B 5/14* (2006.01)
*A43B 1/00* (2006.01)

(52) U.S. Cl.
CPC ........... *B62M 3/086* (2013.01); *A43B 1/0054* (2013.01); *A43B 5/14* (2013.01)

(58) Field of Classification Search
CPC . B62M 3/08; B62M 3/16; B62M 3/086; B62J 45/411; A43B 1/0054; A43B 5/14
See application file for complete search history.

(56) References Cited

U.S. PATENT DOCUMENTS

| 5,473,963 | A | 12/1995 | Aeschbach | |
|---|---|---|---|---|
| 7,823,300 | B2 | 11/2010 | Fullerton et al. | |
| 9,545,972 | B2 | 1/2017 | Williams | |
| 10,577,047 | B2 | 3/2020 | Payne | |
| 2011/0219911 | A1* | 9/2011 | Zoumaras | B62J 25/04 74/594.6 |
| 2014/0224062 | A1* | 8/2014 | Vigliotti | B62M 3/086 74/594.6 |
| 2017/0106940 | A1* | 4/2017 | Paick | B62M 6/50 |
| 2020/0353313 | A1 | 11/2020 | Chen | |
| 2022/0081062 | A1* | 3/2022 | Ganz | B62J 45/412 |
| 2022/0289326 | A1* | 9/2022 | Talda | B62J 45/421 |
| 2022/0296979 | A1* | 9/2022 | Rauzier | A63B 24/0062 |

FOREIGN PATENT DOCUMENTS

| EP | 1812282 | B1 | 7/2008 | | |
|---|---|---|---|---|---|
| EP | 3269625 | A1 | 1/2018 | | |
| EP | 3889023 | A1 * | 10/2021 | ............. | B62M 3/08 |
| FR | 3078158 | A1 * | 8/2019 | ............. | B62M 3/08 |
| WO | 2011102636 | A2 | 8/2011 | | |
| WO | 2020111770 | A1 | 6/2020 | | |
| WO | WO 2021028845 | A1 * | 2/2021 | ............. | B62J 45/411 |

* cited by examiner

*Primary Examiner* — Vinh Luong
(74) *Attorney, Agent, or Firm* — Young Basile Hanlon & MacFarlane, P.C.

(57) ABSTRACT

A pedal comprising: (a) a housing; (b) a magnet have a portion located within the housing and a portion extending outside of the housing; and (c) a hall effect sensor connected to or located within the housing and configured to measurement movement, rate of movement, or both of the pedal.

20 Claims, 8 Drawing Sheets

SMART SELF-LOCKING MAGNETIC BIKE PEDAL

CROSS-REFERENCE TO RELATED APPLICATION(S)

This application claims the benefit of U.S. Provisional Patent Application No. 63/214,907, filed on Jun. 25, 2021, the entire disclosure of which is hereby incorporated by reference.

FIELD

The present teachings relate to a magnetic bike pedal and more specifically an electromagnetic bike pedal that adjusts an amount of force applied based upon a monitored condition.

BACKGROUND

Bicycles include pedals that a user rotates to move the bicycle. Toe loops were added to the bicycles in order to assist a user in maintaining contact with the pedal and so that some force may be applied in a pulling direction as the foot moves up. More recently clip in shoes were added to pedals where a bike shoe clips into the pedal so that a stronger connection is formed between a pedal and a shoe. Examples of connections between a shoe and a pedal may be disclosed in U.S. Pat. Nos. 5,473,963; 7,823,300; 9,545,972; and 10,577,047 all of which are expressly incorporated herein by reference for all purposes. Thus, there is a need for a pedal attachment device where a pedal and shoe are magnetically connected. There is a need for an electromagnetic attachment that is variable so that when a user is pedaling a shoe and pedal are held together and when pedaling ceases the shoe is released. It would be desirable to have an electromagnetic shoe, pedal, or both that include a variable amount of force. There is a need for a that monitors a rotation rate of a pedal and varies an amount of connection force depending upon the pedaling rate. It would be desirable to have a controller that monitors a user to release a shoe from a pedal or to maintain a connection force between a shoe and a pedal.

SUMMARY

The present teachings provide: a pedal comprising: (a) a housing; (b) a magnet including a portion located within the housing and a portion extending outside of the housing; and (c) a hall effect sensor connected to or located within the housing and configured to measurement movement, rate of movement, or both of the pedal.

A shoe assembly configured to connect to a bicycle shoe, the shoe assembly comprising: (a) an enclosure, (b) one or more internal magnets configured to provide a first amount of force when located proximate to a pedal; and (c) one or more strike plates configured to provide a second amount of force when the magnet is electrified.

A method comprising: (a) connecting one or more magnets and one or more hall effect sensors to or within a pedal; (b) connecting one or more strike plates to or within a shoe assembly; (c) monitoring a rotation rate of the pedal with the one or more hall effect sensors; and (d) varying an amount of force applied by the one or more magnets to the one or more strike plates based upon the rotation rate measured by the one or more hall effect sensors.

A bicycle comprising: (a) a permanent magnet; (b) the pedal taught herein, (c) the shoe assembly taught herein.

The present teachings provide a pedal attachment device where a pedal and shoe are magnetically connected. The present teachings provide an electromagnetic attachment that is variable so that when a user is pedaling a shoe and pedal are held together and when pedaling ceases the shoe is released. The present teachings provide an electromagnetic shoe, pedal, or both that include a variable amount of force. The present teachings monitor a rotation rate of a pedal and varies an amount of connection force depending upon the pedaling rate. The present teachings provide a controller that monitors a user to release a shoe from a pedal or to maintain a connection force between a shoe and a pedal.

DETAILED DESCRIPTION

Figure 1:
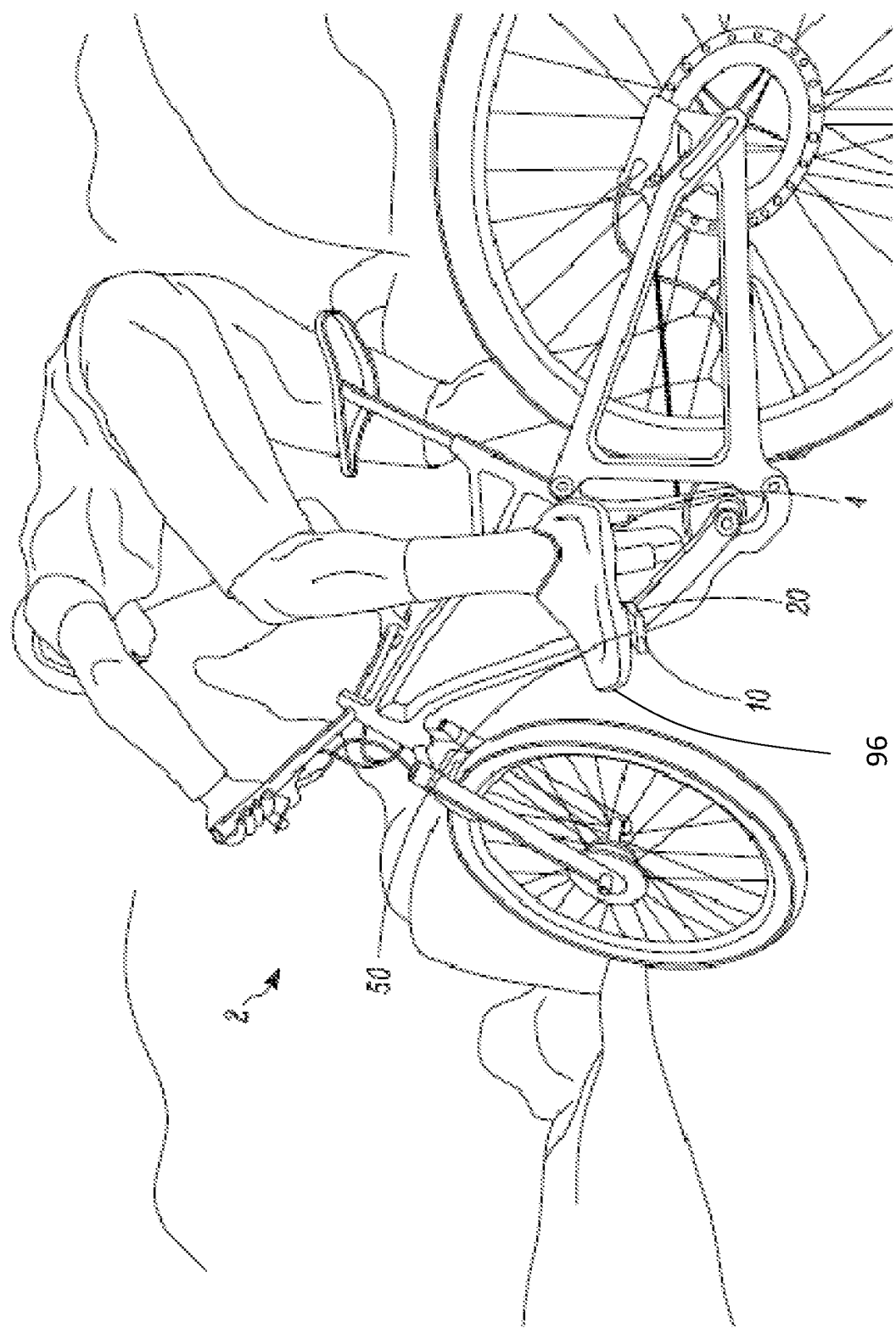
FIG. 1 is a perspective view of a bicycle including the pedal and shoe assembly taught herein.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a bicycle including a self-adjusting and locking bike pedal. The bicycle may be any bicycle that a user may ride. Preferably, the bicycle is one that is used for competition or serious cyclists (e.g. a road bike or a mountain bike). The bicycle includes two pedals and a frame. The frame may include a magnetic material, a ferrous material, a permanent magnet, or a combination thereof.

The one or more permanent magnets function to provide a surface that communicates with a hall effect sensor, that a hall effect sensor reads, or both. The permanent magnet may be part of the bicycle. The permanent magnet may be added to the bicycle. A portion of the frame may be magnetized, be a ferrous material, read by the hall effect sensor, or a combination thereof. The permanent magnet may be located a distance from the hall effect sensor (e.g., there may be a gap between the two). The permanent magnet may be located within a rotational path of the pedal so that the pedal passes by the permanent magnet. The permanent magnets may be a single permanent magnet located in the path of the pedal. A plurality of permanent magnets may be spaced apart with a path of a pedal. For example, if two permanent magnets are present the two magnets may be located 180 degrees apart or less (e.g., one located at 11 o'clock and one located at 3 o'clock or one located at 9 o'clock and one located at 3 o'clock). Thus, each pedal may pass by a permanent magnet twice during each rotation (e.g., pass by the two permanent magnets one time during a rotation).

The pedal functions to communicate with a shoe or a user to move a bicycle. The pedal may be rotated to move the bicycle. The pedal may connect to a shoe, a shoe assembly, or both. The pedal may form a connection with a shoe so that the pedal may be pulled, pushed, or both by a user. The pedal may include a housing, a pedal spindle, hall effect sensor, magnet, port, power source, bias member, printed circuit board, magnet attachment device, or a combination thereof.

The housing functions to contain all or a portion of the components of the pedal. The housing may prevent fluids, dust, debris, or a combination thereof from entering into the housing. The housing may include one or more holes that components may extend into or out of the housing. The housing may be made of plastic, metal, an elastomeric material, a deformable material, a rigid material, or a combination thereof. The housing may include a top cover, a bottom cover, or both.

The top cover functions to cover all or a portion of the bottom cover. The top cover may seal the components within the bottom cover. The top cover may add lateral rigidity to the electric magnet. The top cover may include one or more through holes. All or a portion of the magnet may extend through the top cover. The top cover may contact the shoe, the shoe mount, the shoe assembly, or a combination thereof. The top cover may be a flat piece that extends over the bottom cover. The top cover may be removable from the bottom cover.

The bottom cover functions to house, support, or both all or a portion of the components. The bottom cover may be deeper than the top cover so that the bottom cover covers the bottom and the four sides/edges of the components. The bottom cover may be deep so that the components fit within the bottom cover. The bottom cover may connect with the top cover to seal components therein. The bottom cover may include one or more through holes. The through holes may receive a pedal spindle, a hall effect sensor, a port, a power source, a magnet attachment device, or a combination thereof. The bottom cover may be rigid. The bottom cover and/or pedal spindle may include bearings to that the bottom cover may rotate relative to the pedal spindle.

The pedal spindle functions to connect the pedal to the bicycle. The pedal spindle may include one or more bearings so that the pedal may rotate about the pedal spindle. The pedal spindle may be connected to one or more gears so that when the pedal is rotated the gears move the bicycle. The pedal spindle may rotate a pedal about a prescribed path so that a hall effect sensor on the pedal passes by a permanent magnet to monitor movement of the pedal.

The hall effect sensor functions to monitor rotation, a rotational rate, a cadence, or a combination thereof of a pedal. The hall effect sensor may monitor a number of times a pedal passes a permanent magnet. The hall effect sensor may be in communication (directly or indirectly) with a power supply, a metal-oxide-semiconductor field effect transistor (MOSFET), a regulator, a hall effect sensor connector, a regulator, a microprocessor, or a combination thereof. The hall effect sensor may be in communication with the microprocessor so that the microprocessor controls an amount of force created by a magnet (e.g., an electromagnet). For example, if the hall effect sensor measures one rotation every 3 seconds the microprocessor may control the magnet to provide a first amount of force and if the hall effect sensor measures one rotation every second the microprocessor may control the magnet to provide a second amount of force that is greater than the first amount of force. In another example, the microprocessor may monitor the hall effect sensor so that the hall effect sensor and the microprocessor may measure rotation of a pedal and the microprocessor may activate the magnet to provide a holding force because rotation was sensed. The magnet may be controlled based upon a feedback from the hall effect sensor.

The magnet functions to connect the shoe assembly to the pedal. The magnet functions to create a holding force with the strike plate. The magnet may be an electromagnet. The magnet may have a variable amount of holding force. The electromagnet may either be on (applying a force) or off (applying no force). The magnet may be connected to a power source that provides a variable amount of power to the magnet so an amount of magnetic force produced is varied. The magnet may be a magnetic material that may only create a magnetic force when power is applied. The magnet may be or include a ferrous material, iron, nickel, cobalt, a rare earth metal, or a combination thereof. The magnet may be magnetized. The magnet may be free of magnetism. The magnet may only provide a magnetic force when power is applied. The magnet may apply a force of about 25 N or more, about 50 N or more, about 75 N or more, about 100 N or more, about 150 N or more, about 200 N or more, or about 250 N or more. The magnet may apply a force of about 1000 N or less, about 750 N or less, about 500 N or less, or about 300 N or less. The magnet may only apply a force when the pedal is being moved, the hall effect sensor senses movement, or both.

The amount of force being applied by the magnet may be varied based upon a sensed movement of the pedal. The magnet may apply a first amount of force (e.g., between 50 N and 100N) when a first pedaling rate is measured (e.g., between 30 rotations and 60 rotations of the pedal per minute) (i.e., slow rate of pedal). The magnet may apply a second amount of force (e.g., between 100 N and 150 N) when a second pedaling rate is measured (e.g., between 60 rotations and 90 rotations of the pedal per minute) (i.e., medium rate of pedal). The magnet may apply a third amount of force (e.g., between 150 N and 250 N) when a third pedaling rate is measured (e.g., between 90 rotations and 120 rotations or more) (i.e., a large rate of pedaling). The amount of force applied may be directly proportional to a rate of pedaling. For example, for every 1 rotation per minute the magnet may apply 2 N of force. Thus, the ratio of rate to pedaling may be 1:2. Thus, for example if someone is pedaling at 50 rotations per minute the amount of force applied may be about 100 N. The controller may determine an amount of force applied by the magnet.

The amount of force may be varied based upon a sensed condition of the rider or the bicycle. The amount of force may be connected to a measuring device (e.g., an accelerometer, a gyroscope, an inclinometer, or tilt sensor). The amount of force may increase as an inclination of the bike increases. For example, if the bicycle begins going up a hill the amount of force may increase (e.g., from a first level to a second level that is higher than the first level). The amount of force may be based upon one of the sensors indicating a change in position of the bicycle. When the measuring device measures a predetermined change (e.g., riding up a hill) the microprocessor may increase a force applied by the magnet and when the measuring device senses a return from the predetermined change (e.g., riding on flat ground or down a hill) the microprocessor may return to a first force.

The one or more measuring device may function to change an amount of force between the pedal and the shoe assembly. The one or more measuring devices may monitor a speed and/or acceleration. The monitoring devices may monitor speed and/or acceleration of the bicycle and if a sudden speed and/or acceleration change is sensed such as a fall event then the amount of force applied may be changed. For example, if the user suddenly slams on the brakes of falls then the magnet may release the pedal and/or shoe assembly, the force may drop to zero, the magnet may be turned off, or a combination thereof. The measuring device may be a gyroscope and/or accelerometer. In addition to or in lieu to the measuring device, the user may have a release button. Thus, if the user wants to manually release the shoe from the pedal, the user may hit the release button and the controller may stop the permanent magnet.

The controller may be a microprocessor, a control module, or both. The controller functions to control an amount of force applied, if any force is applied, or both. The controller may control the MOSFET, calculate cadence, or both. The controller may control an amount of power provided by the power source to the magnet. The controller may be powered by a power source, a power port, or both.

The port functions to provide power, signals, instructions, or a combination thereof to the pedal and associated componentry. The port may be a wired connection, a wireless connection, or both. The port may be any device that allows signals, electricity, controls, or a combination thereof into the pedal and/or controller. The port may be located entirely inside of the housing, externally accessible, or both. The port functions to connect to an electrical source, a signal source, or both. The port functions to connect to a computer. The port functions to connect to a computer, a programming device, or both. The port may be Bluetooth, a near net communication device, Wi-Fi, WAN, LAN, PAN, cellular network, wireless charging, or a combination thereof. The port may be a USB port, a USB-A port, a USB-B port, a USB-C port, a USB 2.0, a USB 3.0, USB mini, USB micro, USB internal connector, a lightening cable, or a combination thereof. The port may connect to a wall socket, a computer, a phone, a tablet, or a combination thereof. The port may be electrically connected to the controller, the power source, a microcontroller, or both.

The power sources function to provide power to the controller, the magnet, the pedal, or a combination thereof. The power source may be a battery, a capacitor, or both. The power source may be any battery that provides power. The power source may be located inside of the pedal. The power source may be connected outside of the pedal. The power source may be a lithium ion battery. The power source may be rechargeable. The power source may be removable. The power source may be swapped with another power source for charging or for extended bike rides. The power sources may be 3.7 v, 5 v, 7.2 v, 11.1 v, 12 v, or 24 v or a combination of power sources. The power sources may be changeable. The power sources may be sufficiently strong or have enough power to last for 1 hour or more, 2 hours or more, or three hours or more. The power source may in communication with a printed circuit board, controller, microprocessor, or a combination thereof. The power source may be located on or within the pedal in a location that does not interfere with the magnetic attachment device.

The magnetic attachment device functions to connect the magnet within the pedal, allow for adjustment of the magnet within the pedal, or both. The magnetic attachment device may adjust an amount the magnet extends about of the pedal. The magnetic attachment device may be any device that adjusts a position of the magnet axially along an axis of the magnetic attachment device. The magnetic attachment device may be a screw, a detented structure, a threaded member, a bolt, or a combination thereof. The magnetic attachment device may extend into the magnet and connect the magnet to the housing, the bottom cover, or both. The magnetic attachment device may be rotated to adjust a position of the magnet along the magnetic attachment device. The magnetic attachment device may be rotated a first direction to move the magnet out of the pedal. The magnetic attachment device may be rotated a second direction to move the magnet into the pedal. The magnetic attachment device may be threaded and upon rotation the magnet may move axially along the magnetic attachment device. The magnetic attachment device may be covered by a bias member that biases the magnet along an axis of the of the magnetic attachment device in a first direction (e.g., up).

The bias member functions to push against the magnet and preferably an electromagnet. The bias member assists in moving the magnet along the magnetic attachment device. The bias member functions to create a force on the magnetic attachment device so that the magnet does not move during use. The bias member may create friction between the magnet and the magnetic attachment device so that the magnet is located in place. The bias member may be any member that is compressible, creates a force, stores energy, or a combination thereof. The bias member may be made of or include a spring, an elastomer, rubber, a rubber washer, a compression spring, or a combination thereof. The bias member may be sandwiched between the magnet and the magnet attachment device, the magnet and the housing, or both. The bias member may provide a bias force in a first direction. The bias member may extend through the printed circuit board or proximate to the printed circuit board.

The printed circuit board functions to control the pedal, the magnet, the controller, the microprocessor, provide communication between different components of the pedal, or a combination thereof. The printed circuit board may be located within the pedal. The printed circuit board include a MOSFET, microprocessor, controller, regulator, battery charger, hall effect sensor connection, hall effect sensor, regulator output, power input, magnetic connector, a hall effect sensor, a power source, or a combination thereof. The printed circuit board may interconnect all of the components so that the pedal functions to provide a clamping force between the pedal and the shoe assembly. The printed circuit board may include one or more MOSFET sensors.

The microprocessor may sense movement measured by the hall effect sensor and may activate and/or deactivate the MOSFET. The MOSFET may control power between the power source and the magnet. The MOSFET may be controlled by the controller and the controller may turn the MOSFET on (i.e., allow power to flow) or turn the MOSFET off (i.e., prevent power from flowing). Preferably, the controller or microprocessor monitors the hall effect sensor and signals the MOSFET when a pre-determined cadence rate is sensed. The MOSFET may be in communication with the microprocessor, controlled by the microprocessor, or both.

The microprocessor functions to control the hall effect sensor, the pedal, the shoe assembly, the MOSFET, the regulators, the magnets, calculate a cadence rate, or a connection therebetween. The microprocessor monitors the hall effect sensor. The microprocessor may affect an amount of power supplied to the magnet based upon a signal from the hall effect sensor. The microprocessor may activate the magnet. The microprocessor may deactivate the magnet. The microprocessor may control the MOSFET to activate and/or deactivate the magnet (e.g., on or off). The microprocessor may vary an amount of force created by the magnet. The microprocessor may control an amount of force generated by the magnet based upon a feedback from the hall effect sensor (e.g., a cyclist's cadence). The microprocessor may be programmed with cadence rates, ranges of cadences, a formula, or a combination thereof to control an amount of force generated by the magnet (i.e., electromagnet). The microprocessor may be connected to one or more regulators, one or more power sources, or both.

The one or more regulators function to control an amount of power supplied from the power source. The one or more regulators may step up voltage, step down voltage, or both. The one or more regulators may vary an amount of a voltage that is applied. The one or more regulators may output 3.7 v, 5 v, 7.2 v, 11.1 v, 12 v., 24 v. or a combination thereof. For example, the pedal, shoe assembly, or both may include a 5 v regulator and a 12 v regulator, which each power different components. One regulator (e.g., 5 v) may supply power to the microprocessor, hall effect sensor, and other components (e.g., every component except for the electromagnet). Another regulator (e.g., 12 v) may supply power to the magnet so that the magnet is an electromagnet. The pedal, shoe assembly, or both may be free of any regulators. The regulator may step up voltage from 3.7 v to 5 v, 12 v, or both.

The battery charger functions to take power from a port and supply the power to the battery so that the battery is fully charged. The battery charger may step down voltage from a standard power source and supply the voltage into the battery. The battery charger may monitor health of a battery. The battery charger may speed charge, slow charge, or both. The battery charger may in communication with the battery and the port so that the battery is charged. The battery charger may be connected to a power input so that power from the port extends to the printed circuit board via the power input and then to the battery by the power charger.

The power input functions to receive power from an external power source, provide power to a component, provide power to the printed circuit board from the battery, provide power to the battery from a port and printed circuit board, or a combination thereof. The power input may input power into any component such as a MOSFET, microprocessor, regulator, hall effect sensor, or a combination thereof. The power input may provide power to the hall effect sensor via a hall effect sensor connection.

The hall effect sensor connection functions to provide power, provide signals, send signals, be turned on, be turned off, or a combination thereof. The hall effect sensor connections may extend to the power source, microprocessor, regulator, magnet, MOSFET, or a combination thereof. The hall effect sensor connection may include one connection for power and one connection for signals. The hall effect sensor connection may connect the hall effect sensor to a regulator output.

The regulator output functions to output power from the regulator to one of the components discussed herein. The regulator output may connect a regulator with a MOSFET, microprocessor, hall effect sensor, magnet, or a combination thereof. If more than one regulator is present than more than one regular outputs may be present. There may be an equal number of voltage regulators and regulator outputs. The regulator outputs may be located on the printed circuit board, located on an output side of a regulator, or both. The regulator outputs may output from the regulator to the microprocessor and a magnetic connector may provide power from the microprocessor, the printed circuit board, a regulator, or a combination thereof via one or more magnetic connectors.

The one or more magnetic connectors function to provide power to the one or more magnets so that the one or more magnets are electrified into an electromagnet. The one or more magnetic connectors may be connected to or extend from a regulator, the power source, microprocessor, or a combination thereof. The magnetic connector may provide a variable amount of power, voltage, or both. The magnetic connector may control a magnetic force produced by the magnet. The magnetic connector may be controlled by the microprocessor and based upon a control signal may regulate power or voltage applied to the magnet so that magnetic force of the magnet is variable. The printed circuit board and associated components such as the MOSFET, microprocessor, regulator battery charger, hall effect sensor, hall effect sensor connection, regulator, regulator output, power input, magnetic connector, or a combination thereof may be part of the pedal, shoe assembly, or both.

The shoe assembly functions to connect a shoe to a pedal. The shoe assembly may be added to a bicycle shoe to provide a magnetic connection between a pedal and shoe. All or a portion of the shoe assembly may fit within a bottom of a shoe. A portion of the shoe assembly may extend outside of the shoe. The shoe assembly may house one or more of a hall effect sensor, magnet, port, power source, bias member, printed circuit board, magnet attachment device, striker plate, internal magnet, mounting assembly, or a combination thereof. The components not within the shoe assembly may part of the pedal. For example, if the shoe assembly includes a magnetic material then the pedal includes the magnet or vice versa. The shoe assembly includes one or more enclosure for housing all or a portion of the components discussed herein.

The enclosure functions to house all or some of the components to form a connection between the pedal and the shoe assembly. The enclosure may house the passive components (e.g., a magnetic material) or the active components (e.g., a magnet). The enclosure may house opposing components as the pedal so that when the pedal and show assembly are moved proximate to one another the pedal and shoe assembly form a connection. The enclosure may house some components on an interior. The enclosure may house some components on an exterior. The enclosure may be a recess that receives all or a portion of the components. The enclosure may at least partially enclose a magnet, mounting device, strike plate, internal magnet, or a combination thereof so that the exposed portion of the shoe assembly may contact an exposed portion of a pedal. One or more mounting devices may extend into the enclosure to form a connection between the shoe assembly and the shoe, mounting devices, strike plate, magnet, or a combustion thereof.

The mounting devices function to connect a shoe with a shoe assembly, a strike plate to a shoe assembly, internal magnets to a strike plate and/or a shoe assembly, a magnet with a shoe assembly, a magnet with a pedal, a strike plate with a pedal, internal magnets to a strike plate and/or pedal, a magnet with a pedal, or a combination thereof. One or more of the plurality of mounting devices may connect a strike plate, a shoe assembly, or both to a shoe. For example, a mounting device may extend through the strike plate and into a shoe to connect the shoe assembly to a shoe. The mounting devices may be any device that forms a connection between two or more components. The mounting devices may be threaded, stepped, removable permanent, an adhesive, a christmas tree connector, a bolt, a screw, twist and lock, or a combination thereof. The mounting devices may extend through a part that is being connected. The mounting devices may extend through one or more parts, two or more parts, or even three or more parts. The mounting devices may connect a magnet, strike, plate, internal magnets, or a combination thereof to a pedal, shoe assembly, or both.

The strike plate functions to interact with the magnet so that a holding forces is created or provided. The strike plate may be a piece of magnetic material. The strike plate may be made of iron, nickel, cobalt, a ferrous material, a rare earth metal, or a combination thereof. The strike plate may be similarly sized to the magnet so that when the magnet is electrified the magnet creates a force with the strike plate. The strike plate may have a shape that allows float for the rider. The strike plate may be circular, square, rectangular, triangular, an octagon, a hexagon, a pentagon, or a combination thereof. The strike plate may be sufficiently thick so that the holding force taught herein may be created. The strike plate may be flush with a bottom of a shoe or extend out of a bottom of a shoe. The strike plate includes one or more recesses that receive one or more internal magnets.

The internal magnets function to form an initial connection with the magnet. The internal magnets may connect to the magnet before the magnet is electrically activated. The internal magnets may form an initial connection between the pedal and shoe assembly. The internal magnets may form an initial connection with a force of about 1 N or more, about 5 N or more, about 7 N or more, or about 10 N or more. Internal magnets may be a pair of internal magnets that each create a force. The internal magnets may create a holding force until pedaling begins and the electromagnet creates a second larger force. The internal magnets may create a force that is sufficiently strong to hold the shoe assembly in connection with the pedal. The internal magnets may made of a same or similar material as the magnet discussed herein. The internal magnets may create a first holding force that is sufficiently strong that the shoe and pedal are connected so that pedaling may begin. The internal magnets may function to create a holding force until the method discussed herein may be performed.

The method may include varying an amount of force created by the magnet. The device or user may turn the magnet on and off. The device may regulate an amount of power applied to the magnet. The device may measure a speed of rotation (e.g., cadence of pedaling) and then regulate a force applied by the magnet according to the speed of pedaling. The device may include a hall effect sensor that monitors the speed of rotation. The device may increase or decrease a force based upon if a rate of pedaling is increasing or decreasing. The microprocessor may control an amount of force output by the magnet. The microprocessor, the regulator, or both may control an amount of force output by the magnet.

FIG. 1 illustrates a bicycle 2 including the pedal 10 and shoe assembly 50 in communication so that the user's shoe 96 (e.g., a bicycle shoe 96) is held in communication with the pedal 10. The bicycle 2 includes a permanent magnet 4 that is read by a hall effect sensor 20 on the pedal to determine a cycle rate of the pedal 10 and an amount of force applied by the pedal 10 to the shoe assembly 50.

Figure 2:
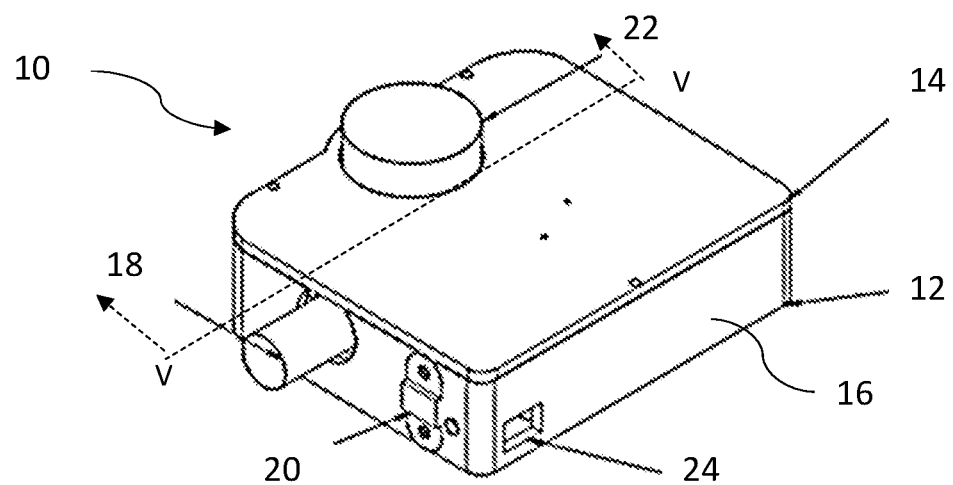
FIG. 2 is a perspective view of a pedal.

FIG. 2 illustrates a perspective view of a pedal 10. The pedal 10 includes a housing 12 with a top cover 14 and a bottom cover 16. A spindle 18 extends out of the housing 12 to connect the pedal 10 with a bicycle (see e.g., FIG. 1). A hall effect sensor 20 is connected to the housing 12 that senses a position of the pedal 10 and a rate of movement of the pedal 10. A magnet 22 extends out of a top of the housing 12 and the magnet 22 is configured to connect with the shoe assembly (see e.g., FIGS. 6A-6B). The housing 12 includes a port 24 configured to power, recharge, program, exchange data, or a combination thereof between the pedal 10 and a user.

Figure 3:
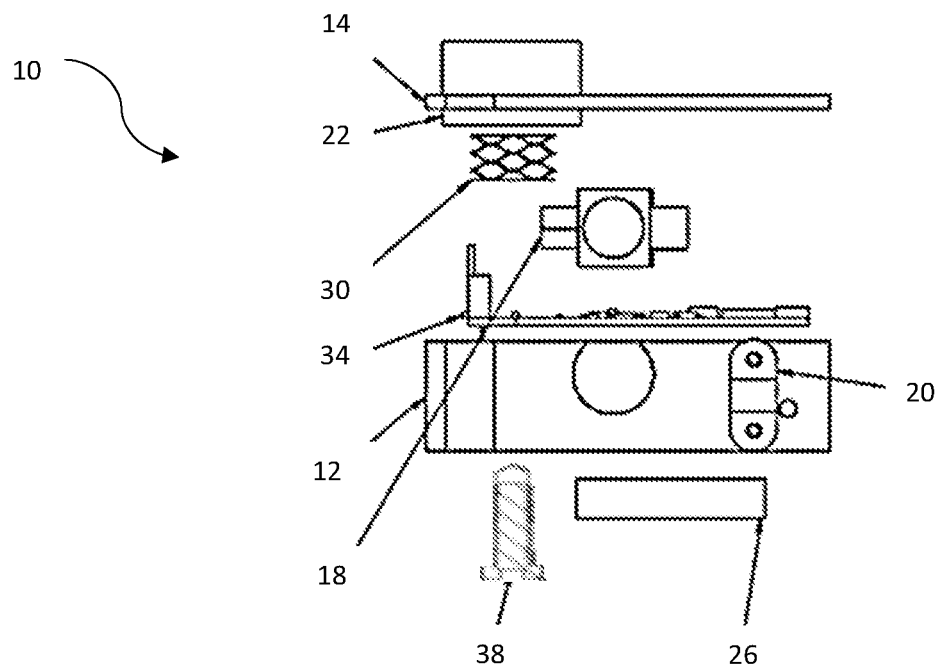
FIG. 3 is an exploded view of a pedal.

FIG. 3 is an exploded view of a pedal 10. The pedal 10 includes a housing 12 that is divided into a top cover 14 and a bottom cover 16. A pedal spindle 18 extend through a hole the bottom cover 16 to connect the pedal 10 to a bicycle. A hall effect sensor 20 is connected to an outside of the bottom cover 16 proximate to the spindle 18 so that the hall effect sensor 20 can monitor a rotational rate of the pedal 10. A magnet 22 extends partially through the top cover 14 and is held in place by a magnet attachment device 38. A bias member 30 adds resistance to the magnet 22 so that the magnet 22 is biasable up and down by rotating the magnet attachment device 38. A printed circuit board 34 is located below the magnet 22 and assist in controlling the magnet 22. The printed circuit board 34 is connected to a power source 26 that provides power to the magnet 22 to vary an amount of force applied by the magnet 22.

Figure 4:
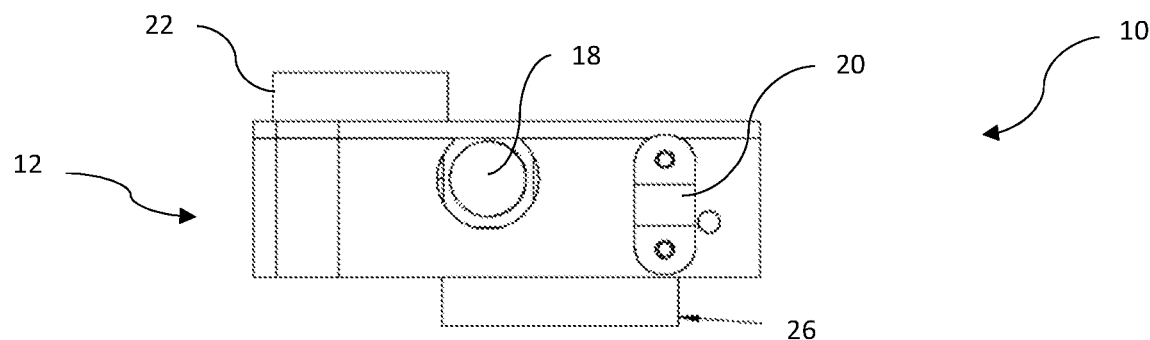
FIG. 4 is a side view of a pedal.

FIG. 4 is a side view of the pedal 10. The pedal 10 includes a housing 12. A magnet 22 extend through the top of the housing 12 and a pedal spindle 18 extends through a side of the housing 12. The housing 12 includes a hall effect sensor 20 connected to a side and a battery 26 connected to a bottom.

Figure 5:
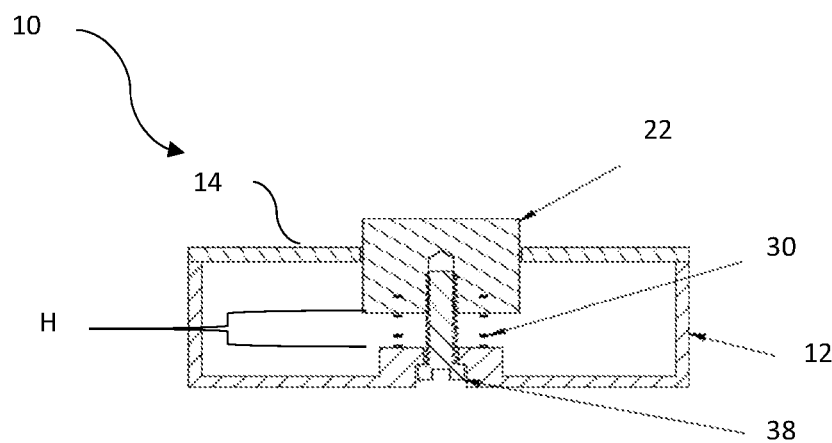
FIG. 5 is a cross sectional view of a pedal in FIG. 2 along lines 5A-5A.

FIG. 5 is a cross-sectional view of a pedal 10 of FIG. 2 along lines 5A-5A. The pedal 10 includes a housing 12 with a top cover 14. A magnet 22 extends through the top cover 14. The magnet 22 is maintained in place by a magnet attachment device 38. A height (H) of the magnet 22 is varied by rotating the magnet attachment device 38. If the magnet attachment device 38 is rotated in a first direction (e.g., counterclockwise) the bias member 30 decompresses in a first direction pushing the magnet 22 up so that the height (H) is increased. If the magnet attachment device 38 is rotated in a second direction (e.g., clockwise) the bias member 30 is compressed by the magnet 22 so that the height (H) is decreased.

Figure 6A:
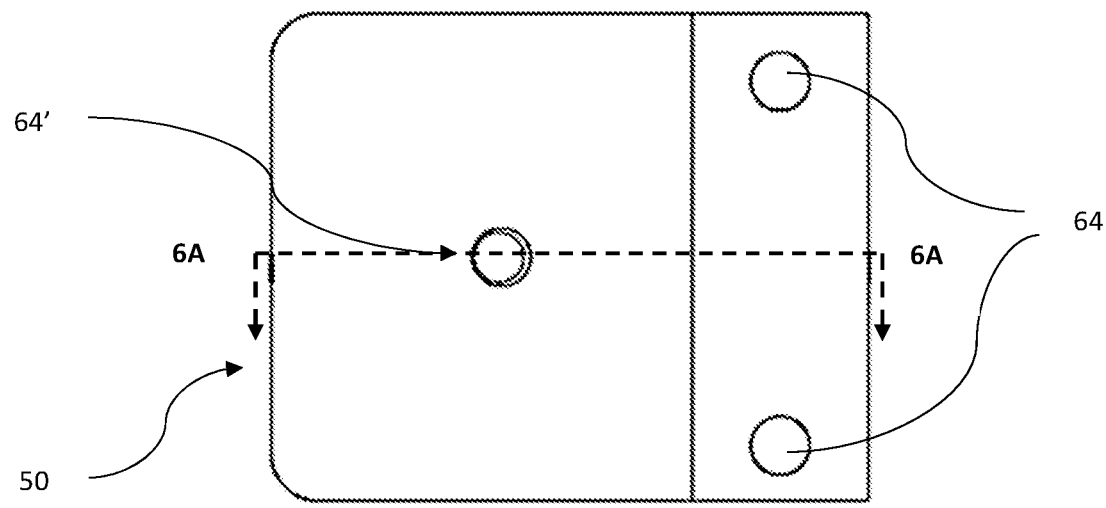
FIG. 6A is a top view of a portion of the shoe assembly.

FIG. 6A is a top view of a shoe assembly 50. The shoe assembly includes a pair of mounting devices 64 that mount the shoe assembly 50 to a shoe. The shoe assembly 50 also includes a mounting device 64' that mounts components inside of the shoe assembly 50

Figure 6B:
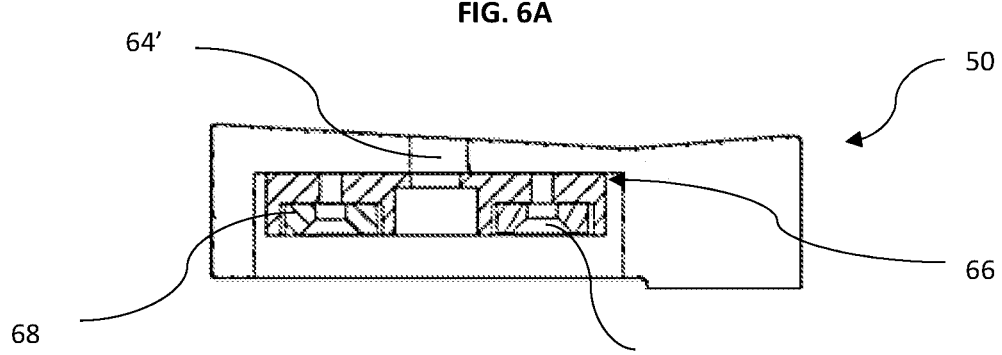
FIG. 6B is a cross-sectional view of the partial shoe assembly of FIG. 6A across lines A-A.

FIG. 6B is cross-sectional view of the shoe assembly 50 of FIG. 6A along lines 6A-6A. The shoe assembly includes a strike plate 66 held in place by a mounting device 64'. The mounting device 64' also connects the shoe assembly 50 to a shoe. Internal magnets 68 are located within recesses of the strike plate 66 and are held in place by mounting devices 64". The internal magnets 68 apply a first amount of force to connect the shoe assembly 50 to the pedal (not shown) and once pedaling commences the magnet of the pedal applies a second amount for force to the strike plate 66 to maintain a connection between the shoe assembly 50 and the pedal.

Figure 7:
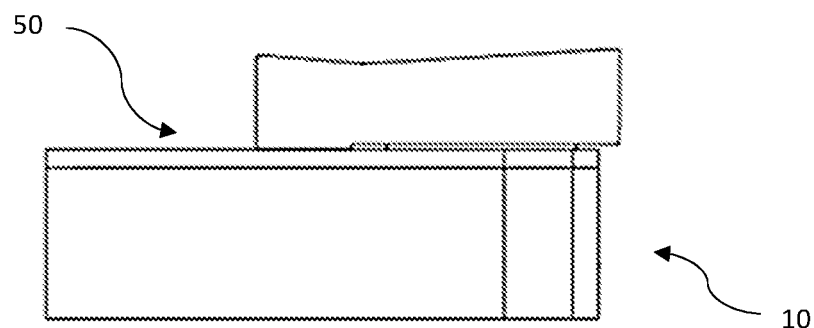
FIG. 7 is a side view of a shoe assembly in communication with a pedal.

FIG. 7 illustrates a side view of the pedal 10 connected to the shoe mount 50.

Figure 8A:
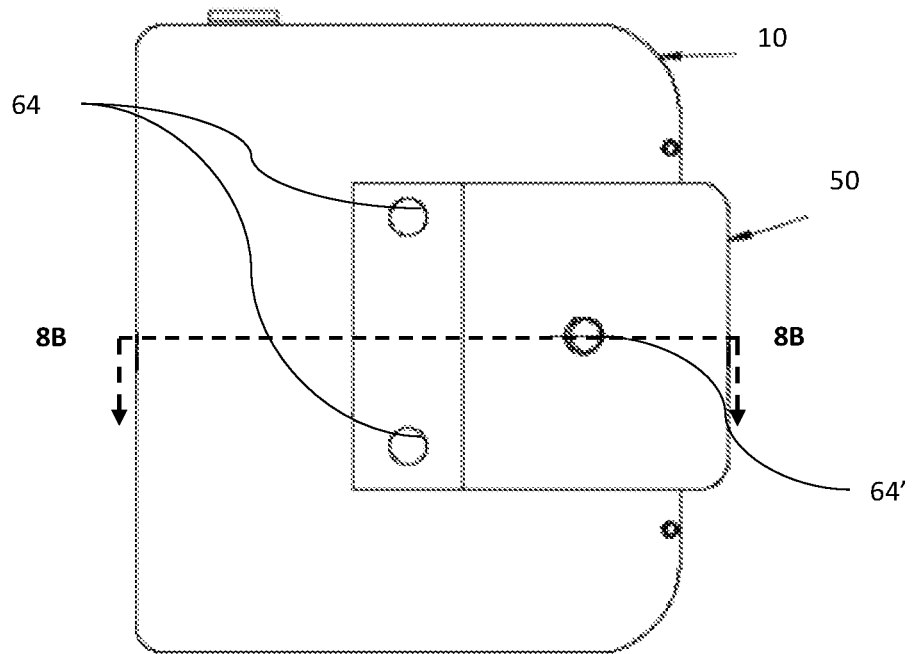
FIG. 8A is a top view of a shoe assembly connected to a pedal.

FIG. 8A a top view of the shoe mount 50 connected to the pedal 10. The shoe mount 50 includes mounting device 64, 64' that connect the shoe mount 50 to a shoe (not shown). The shoe mount 50 also includes mounting device 64' that connects internal component (not shown) within the shoe mount 50 that assist in forming a connection with the pedal 10.

Figure 8B:
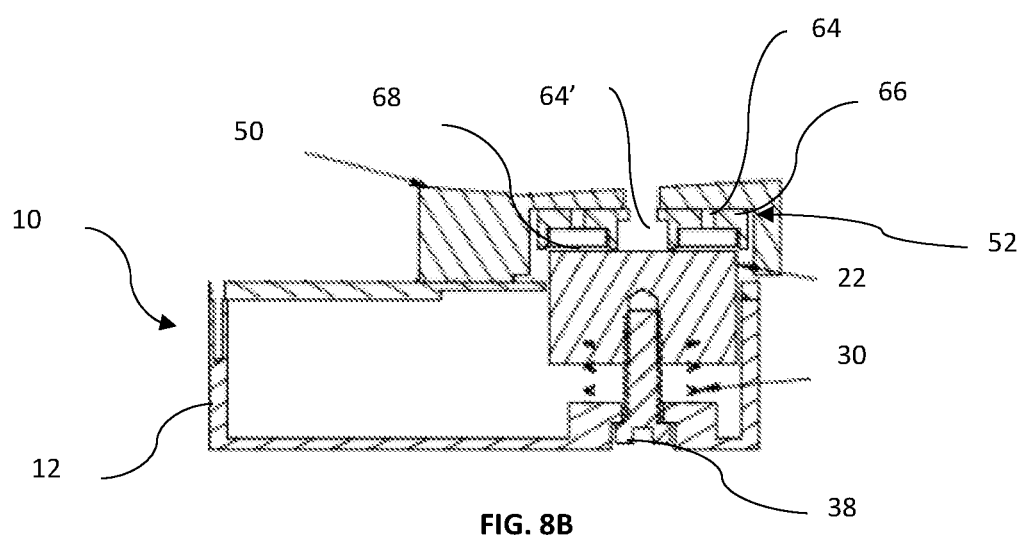
FIG. 8B is a cross-sectional view of the shoe assembly and pedal of FIG. 8A across lines B-B.

FIG. 8B is a cross-sectional view of FIG. 8A along lines 8B-8B. As shown, the pedal 10 and the shoe assembly 50 are connected together. The pedal 10 includes a housing 12 that contains a portion of the magnet 22, which is held in place by a magnet attachment device 38 and is spaced within the housing 12 by a bias device 30. The shoe assembly 50 includes an enclosure 52. The enclosure 52 includes internal magnets 68 that are connected within the enclosure 52 by mounting devices 64. The internal magnets 68 when located proximate to the magnet 22 form a first level of connection so that the pedal 10 and shoe assembly 50 are connected. The shoe assembly 50 also includes a strike plate 66 that is connected by a mounting device 64' within the enclosure 52. The strike plate 66 connects to the magnet 22 when the pedal 10 so that a second stronger level of connection is formed. The strike plate 66 is connected to the shoe assembly 50 and the shoe (not shown) by a mounting device 64' not shown. When the pedal 10 stops moving the amount of force applied between the strike plate 66 and the magnet 22 is reduced so that a user can remove their foot.

Figure 9:
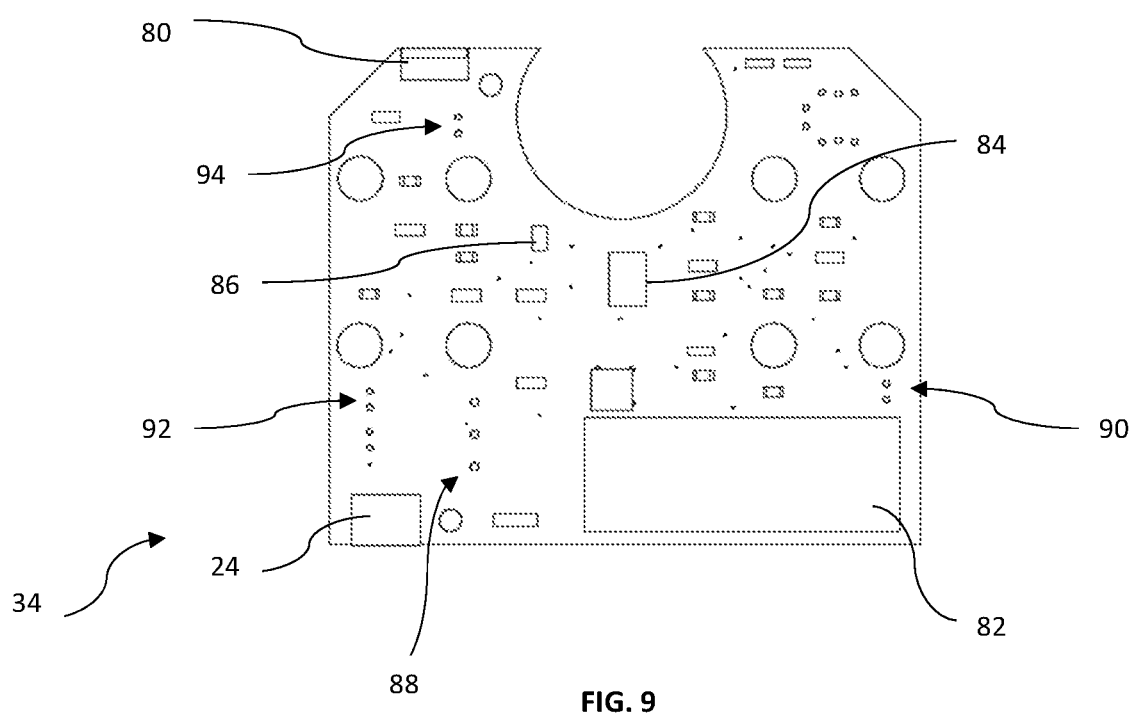
FIG. 9 is a top view of a printed circuit board.

FIG. 9 is a top view of the printed circuit board 34 and its associated componentry. The printed circuit board 34 includes a port 24 that receives power, signals, recharges a battery, powers an electromagnet, reprograms the pedal, or a combination thereof. The printed circuit board 34 includes a MOSFET 80 that turns on and off to magnet 22 when a signal or instructions are received by a microprocessor 82. The microprocessor 82 monitors the hall effect sensor (not shown) and controls the magnet 22 (not shown) by sending a signal to the MOSFET 80 to activate the magnet 22. The microprocessor 82 also calculates a cadence (e.g., a pedaling rate) based upon signals received from the hall effect sensor (not shown). If the cadence rate is above a pre-defined threshold then the microprocessor 82 communicates with the MOSFET 80 to activate or deactivate the electric magnet 22. A regulator 84 may be in communication with the microprocessor 82 and may assist in regulating an amount of power provided to the various components of the printed circuit board 34 via the regulator output 90 (e.g., 5 volts or 12 volts). The regulator output 90 provides 5 v power to the printed circuit board and all peripheral devices except for the electric magnet 22. An external power regulator (not shown) provides 12 v power to the electric magnet 22. A battery charger 86 receives power from the port 24 and recharges the battery (not shown). The hall effect sensor (not shown) is connected to the printed circuit board via the hall effect sensor connection 88. Power may be supplied to the printed circuit board 34 from the battery via the power input 92 so that the components are powered. A magnetic connector 94 provides power from the battery to the magnet 22 (not shown) that the magnet is transformed into an electromagnet.

Figure 10:
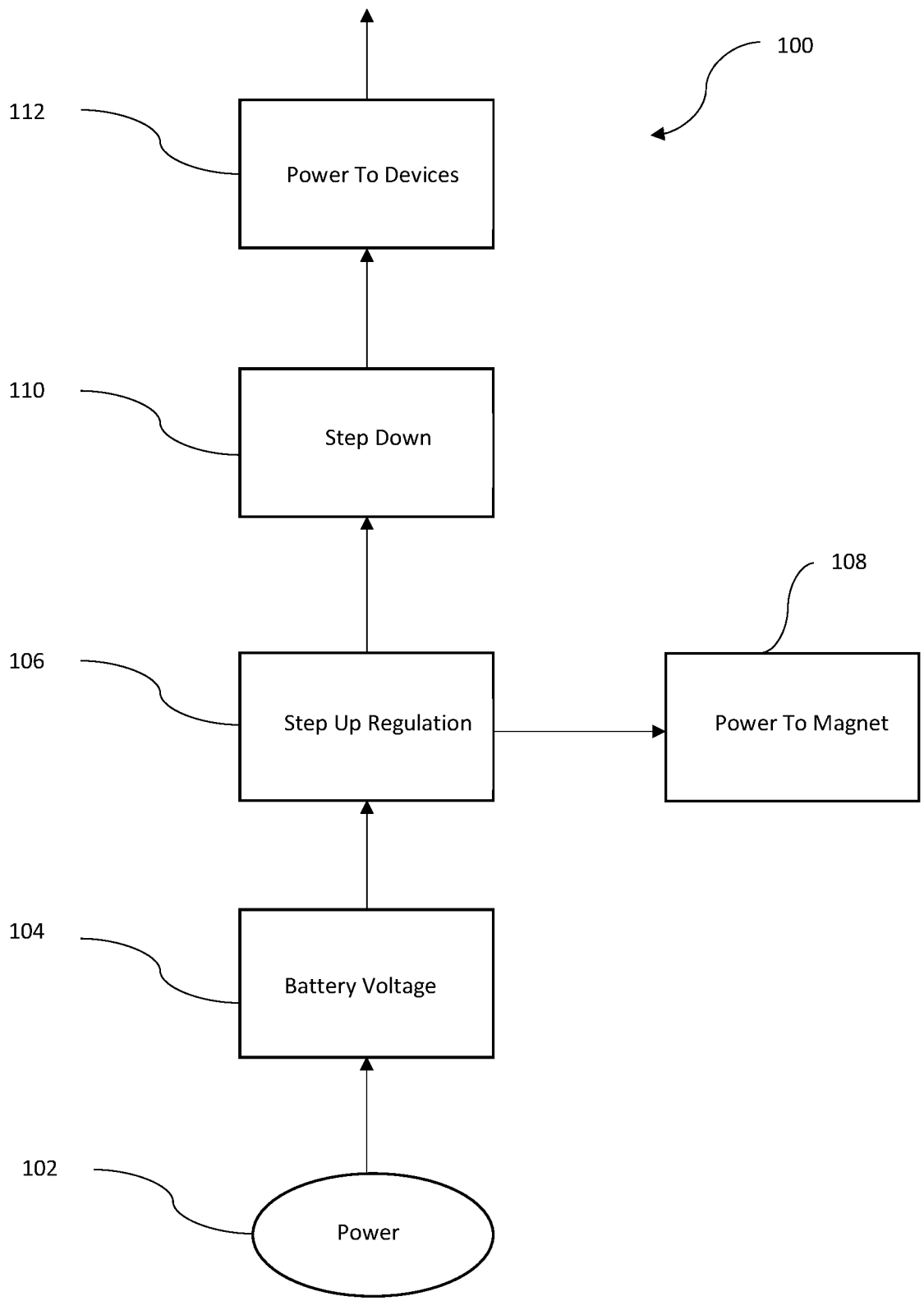
FIG. 10 is a power flow diagram.

FIG. 10 is a power flow diagram 100 illustrating the power distribution of the system and device taught herein. The power flow diagram 100 begins by the power being turned on 102. The battery 104 supplies a voltage (e.g., 3.7 v) to regulator 106 (e.g., a step-up regulator). The regulator 106 changes the voltage to an appropriate voltage to power the electric magnet 108 (e.g., 12 v). The voltage from the regulator 106 is then fed to the electric magnet 108 and a second regulator 110. The second regulator 110 (e.g., step-down regulator) then changes the voltage to an appropriate voltage (e.g., 5 v). The voltage from the second regulator 110 is then supplied to power the microprocessor and other componentry as needed.

Figure 11:
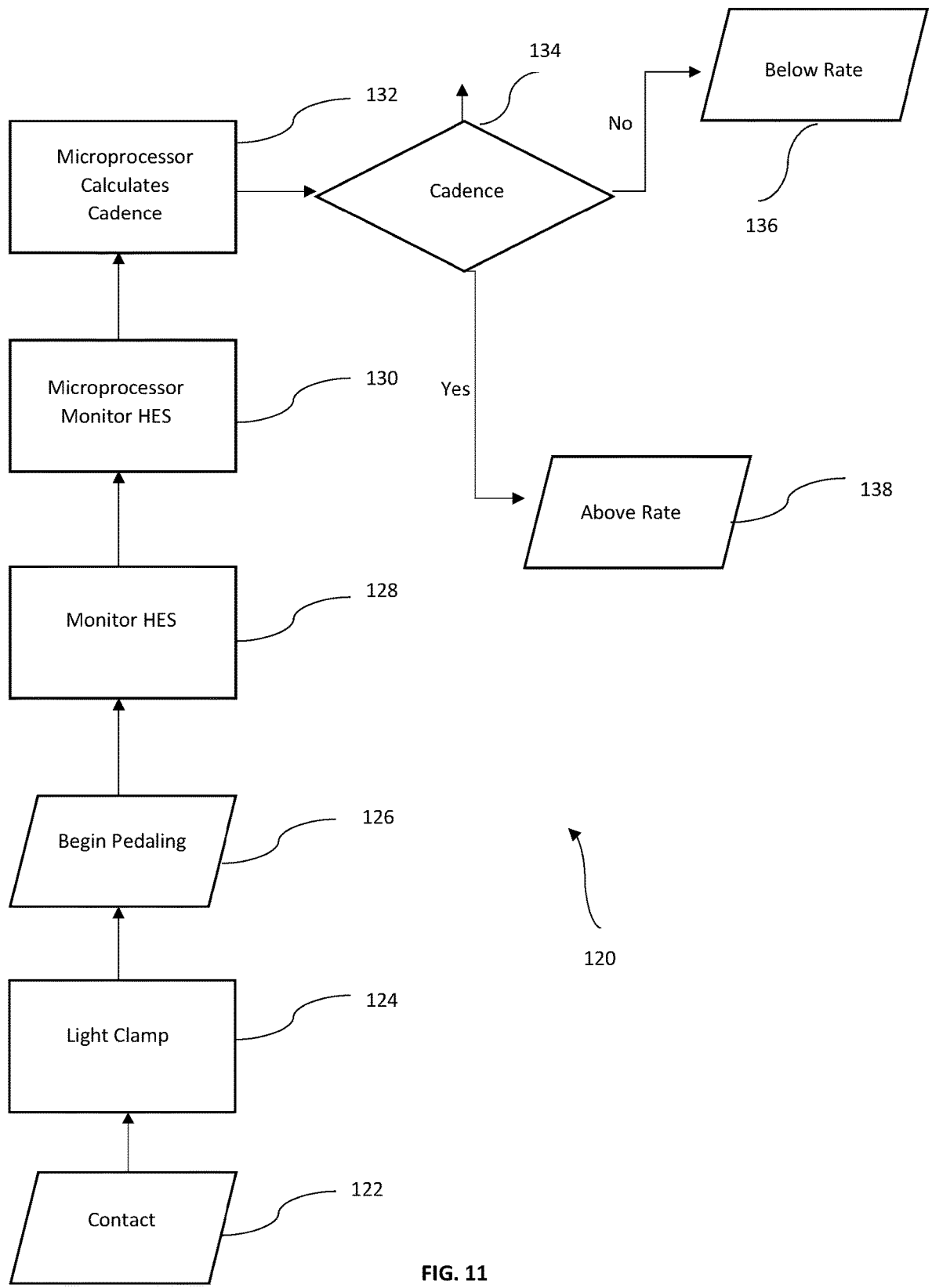
FIG. 11 is a control diagram.

FIG. 11 is a control diagram 120. The control diagram 120 begins when contact is made between the shoe and the pedal 122. When the shoe and the pedal 122 make contact a first light clamp 124 is formed. The light clamp 124 assists in maintaining contact between the shoe and the pedal 122 so that the user can begin pedaling 126. As the user pedals 126 the hall effect sensors 128 sense the pedaling rate (cadence) and the microprocessor 130 monitors the hall effect sensors 128. The microprocessor 130 determines the pedaling rate 132 and then compares the calculated pedaling rate 132 to a predetermined pedaling rate (cadence) 134. If the calculated pedaling rate is below the predetermined cadence rate 136 then the microprocessor instructs the MOSFET to turn off or remain off. If the calculated pedaling rate is above the predetermined cadence rate 138 then the microprocessor instructs the MOSFET to turn on or remain on.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Bicycle
4 Permanent Magnet
10 Pedal
12 Housing
14 Top Cover
16 Bottom Cover
18 Pedal Spindle
20 Hall Effect Sensor
22 Magnet
24 Port
26 Power Source
30 Bias Member
34 Printed Circuit Board
38 Magnet Attachment Device
50 Shoe Assembly
52 Enclosure
64 Mounting Device
66 Strike Plate
68 Internal Magnet
80 MOSFET
82 Microprocessor
84 Regulator
86 Battery Charger
88 Hall Effect Sensor Connection
90 Regulator Output
92 Power Input
94 Magnetic Connector
100 Power Diagram
102 Power
104 Battery Voltage (e.g., 3.7 v)
106 Step up Regulation (e.g., 12 v)
108 Power to Magnet
110 Step Down (e.g., 5 v)
112 Power to Devices
120 Control Diagram
122 Contact Between Shoe and Pedal
124 Light Clamp
126 User Begins Pedaling
128 Hall effect Sensor Monitors
130 Microprocessor Monitors Hall Effect Sensor
132 Microprocessor Calculates Cadence
134 Cadence Calculation is Compared to a Predetermined Cadence.
136 Below Predetermined Cadence Rate (MOSFET) Keeps Off or Turns Off
138 Above Predetermined Cadence Rate (MOSFET) Keeps On or Turns On

I claim:

1. A pedal comprising:
   a) a housing;
   b) a magnet including a portion located within the housing and a portion extending outside of the housing;
   c) a hall effect sensor connected to or located within the housing and configured to measure movement, rate of movement, or both of the pedal; and
   d) a printed circuit board is located within the pedal and the printed circuit board is in communication with the hall effect sensor so that the hall effect sensor provides the measurement of the movement, the rate of the movement, or both and an amount of force generated by the magnet is varied based upon the hall effect sensor.

2. The pedal of claim 1, wherein the pedal includes a power source and the magnet is connected to the power source so that when the pedal moves the magnet is powered so that the magnet is an electromagnet.

3. The pedal of claim 1, wherein the housing includes a port to charge a power source of the pedal, to calibrate the pedal, to provide settings, or a combination thereof.

4. The pedal of claim 1, wherein a power source is connected to a bottom of the pedal.

5. The pedal of claim 1, wherein the magnet is located on an opposite side of the housing as a power source.

6. The pedal of claim 1, wherein the magnet is connected to the pedal by a magnet attachment device.

7. The pedal of claim 6, wherein a bias member is located under the magnet to bias the magnet upward when the magnet attachment device is rotated in a first direction and the magnet attachment device biases the bias member down when the magnet attachment device is rotated in a second direction.

8. The pedal of claim 1, wherein the magnet of the pedal is configured to connect to a shoe assembly that is part of a shoe of a user.

9. A shoe assembly configured to connect to a bicycle shoe, the shoe assembly comprising:
   a) an enclosure,
   b) one or more internal magnets configured to provide a first amount of force when located proximate to a pedal; and
   c) one or more strike plates configured to provide a second amount of force when the one or more internal magnets are electrified;
   wherein the shoe assembly connects the bicycle shoe to the pedal of claim 1.

10. The shoe assembly of claim 9, wherein the one or more internal magnets are two internal magnets.

11. The shoe assembly of claim 9, wherein the one or more internal magnets are connected to the shoe assembly, the enclosure, or both by one or more mounting devices.

12. The shoe assembly of claim 9, wherein the one or more strike plates are connected to the shoe assembly, the enclosure, or both by one or more mounting devices.

13. The shoe assembly of claim 9, wherein the shoe assembly is connected to the bicycle shoe by one or more mounting devices.

14. A bicycle comprising:
a) the pedal of claim 1,
b) a shoe assembly,
c) a permanent magnet connected to the bicycle adjacent to the pedal.

15. The bicycle of claim 14, wherein the hall effect sensor measures an amount of times the hall effect sensor passes the permanent magnet.

16. The pedal of claim 1, further comprising:
a microprocessor located on the printed circuit board and in communication with the hall effect sensor, wherein the microprocessor increases the amount of force generated by the magnet based on the measurement of the movement, the rate of the movement or both increasing and decreases the amount of force generated by the magnet based on the measurement of the movement, the rate of the movement or both decreasing.

17. A method comprising:
a) connecting one or more magnets and one or more hall effect sensors to or within a pedal;
b) connecting one or more strike plates to or within a shoe assembly;
c) monitoring a rotation rate of the pedal with the one or more hall effect sensors; and
d) varying an amount of force applied by the one or more magnets to the one or more strike plates based upon the rotation rate measured by the one or more hall effect sensors that are connected to a printed circuit board that is located within the pedal, wherein the amount of force is increased as the rotation rate increases, and the amount of force decreases as the rotation rate decreases.

18. The method of claim 17, wherein the one or more magnets are connected to a power source and the power source applies power to the one or more magnets so that the magnet is an electromagnet.

19. The method of claim 17, further comprising varying an amount of power applied to the one or more magnets to control a holding force of the one or more magnets.

20. The method of claim 18, further comprising recharging the power source by supplying power through a port.

\* \* \* \* \*